Aug. 13, 1957  W. H. PEABODY  2,802,688

PAN LIFTER

Filed Aug. 6, 1953

INVENTOR.
William H. Peabody
BY
Thos. L. Donnelly
attorney

2,802,688

PAN LIFTER

William H. Peabody, Detroit, Mich.

Application August 6, 1953, Serial No. 372,698

1 Claim. (Cl. 294—34)

My invention relates to a new and useful improvement in a pan lifter, whereby pans such as pie plates, cake pans and the like may be lifted and removed from the oven while hot without endangering the burning of the person's hand and without the likelihood of the pan dropping from the lifter.

It is an object of the present invention to provide a pan lifter of this class which will be simple in structure, economical of manufacture, durable, compact and highly efficient in use.

Another object of the invention is the provision of a pan lifter of this class so constructed and arranged that a pan containing a cake or pie may be lifted and carried about without damage to the cake or pie when the lifter is attached to the pan.

Another object of the invention is the provision in a pan lifter of this class a structure whereby the pan when gripped by the lifter may be locked in position.

Other objects will appear hereinafter.

It is recognized that various modifications and changes may be made in the detail of structure illustrated without departing from the invention and it is intended that the present disclosure shall be considered to be but the preferred embodiment.

Forming a part of this application are drawings in which.

Figure 1:
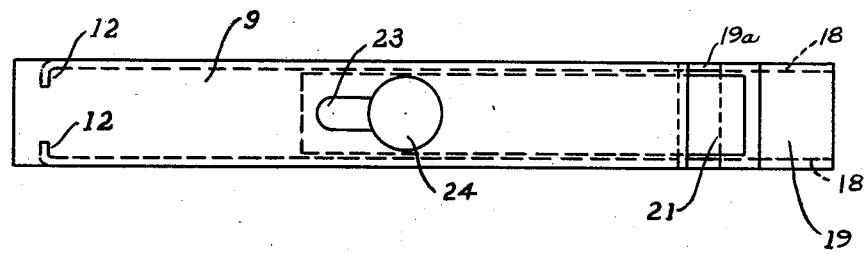
Fig. 1 is a top plan view of the invention.
Figure 2:
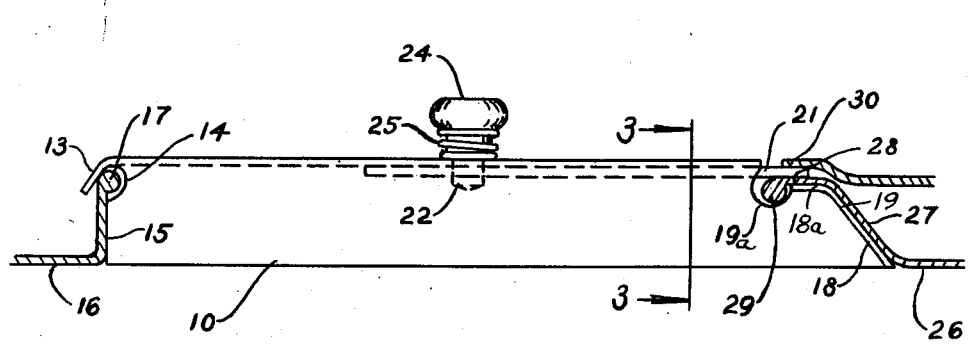
Fig. 2 is a side elevational view of the invention.
Figure 4:
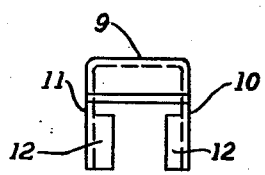
Fig. 4 is an end elevational view of the invention taken from the rear end.
Figure 3:
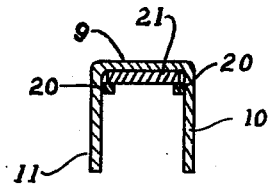
Fig. 3 is a sectional view taken on line 3—3 of Fig. 2.
Figure 5:
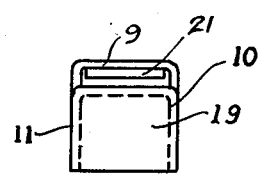
Fig. 5 is an end elevational view of the invention taken from the front end.

The invention comprises an elongated gripping bar which is preferably formed U-shaped and having a bight 9 and the legs 10 and 11. One end of the gripping bar may be termed the rear end and extending inwardly from each of the legs 10 and 11, at this rear end is a flange 12. The top or bight 9 of the bar is provided with a tongue 13 which is turned down angularly as shown in Fig. 2 so as to overlie the open portion of the recess 14 formed in the legs 10 and 11. The construction is such that the tongue 13 will be disposed inwardly of the side wall 15 of a pan held by the lifter and the bead 17 on the pan which engages in the recess 14. In order to mount the lifter on the pan it is, of course, necessary to elevate it so that the tongue 13 moves inwardly to the pan in proximity of the inner surface of the wall 15 so as to permit the bead 17 to enter the recess 14. The handle is then lowered into the position shown in Fig. 2, in which position the flanges 12 will bear against the outer surface of the wall 15 and the tongue 13 will bear against the inner surface of the bead 17 so that a dislodgment of the bead 17 is thus prevented.

As shown in Fig. 2, at the opposite end of the lifter, the legs or walls 10 and 11 are cut on an incline to provide the inclined surface 18. The transverse tongue 19 spans the space between the inclined surfaces 18 of the legs 10 and 11 and is secured thereto. Formed in each leg, inwardly from the inner end of the upper horizontal edge 18a, which extends to the upper end of the inclined surfaces 18, and projecting downwardly into each of the legs 10 and 11 is the recess 19a. Slidable in guides 20 is a plate 21, secured to which is a stud 22 extending through the slot 23 formed in the bight 9. Mounted on the stud 22 is a knob 24 and a spring 25 embraces the stud and lies between the knob and the bight 9. This end of the structure is adapted primarily for lifting a pie pan 26 having the inclined side wall 27 and lip 28 with a bead 29 formed on the outer edge of the lip. When desired to grip a pan of this type the plate 21 is moved rearwardly to the left of Fig. 2 so as to uncover the recess 19a. The structure is then mounted on the pan as shown in the position of Fig. 2 with the bead 29 engaged in the recess 19a. The plate 21 is then moved to the right so that the end of the plate overlies the recess 19a and lies beneath the pie crust 30 which overlies the flange 28 of the pie pan. In this way the pan may be securely gripped by the member without in any manner injuring the appearance of the pie inasmuch as the end of the plate 21 extends beneath the pie crust 30 and will not injure it.

Experience has shown that a pan lifter of this class is very efficient and affords a means of easily and quickly removing pans from the oven without endangering the hands of the person removing the pans.

What I claim is:

A pan lifter of the class described, comprising: an elongated handle, U-shaped in cross section, and having a pair of spaced apart oppositely disposed vertical legs integral at the upper ends thereof with a horizontal bight which terminates rearwardly from the forward end of said legs; a pan bead receiving upwardly facing recess formed in the upper edge of each of said legs immediately forward of the front end of said bight and with the forward edge of said recess terminating below said bight; the forward end of each of said legs being inclined upwardly and inwardly; the front end of the upper edge of each of said legs being horizontal and disposed below said bight and extending from the forward edge of said recess to the upper end of the inclined forward end of said legs; a pan engaging tongue mounted between the inclined front ends of said legs and the front horizontal upper edges thereof; and an elongated engagement plate slidably mounted on said bight and adapted to have the front end thereof movable over said recess for engaging a pan bead in said recess and preventing removal of the same therefrom.

References Cited in the file of this patent

UNITED STATES PATENTS

| | | |
|---|---|---|
| 1,497,738 | Roose | June 17, 1924 |
| 2,074,429 | Randolph | Mar. 23, 1937 |
| 2,262,273 | Ferrara | Nov. 11, 1941 |